(12) United States Patent
Yoshimuta et al.

(10) Patent No.: US 10,102,396 B2
(45) Date of Patent: Oct. 16, 2018

(54) APPLICATION DATA STORAGE AREA GENERATION METHOD, APPLICATION DATA STORAGE AREA GENERATION APPARATUS, AND APPLICATION DATA STORAGE AREA GENERATION PROGRAM

(71) Applicant: FUJITSU LIMITED, Kawasaki-shi, Kanagawa (JP)

(72) Inventors: Mamoru Yoshimuta, Ota (JP); Akio Shimono, Yokohama (JP); Naoki Miyoshi, Machida (JP); Shouhei Mizuno, Itabashi (JP)

(73) Assignee: FUJITSU LIMITED, Kawasaki (JP)

( * ) Notice: Subject to any disclaimer, the term of this patent is extended or adjusted under 35 U.S.C. 154(b) by 233 days.

(21) Appl. No.: 15/079,175

(22) Filed: Mar. 24, 2016

(65) Prior Publication Data
US 2016/0203335 A1    Jul. 14, 2016

Related U.S. Application Data

(63) Continuation of application No. PCT/JP2013/075986, filed on Sep. 26, 2013.

(51) Int. Cl.
*G06F 21/62* (2013.01)
*G06F 21/60* (2013.01)
*H04L 29/06* (2006.01)

(52) U.S. Cl.
CPC ........ *G06F 21/6245* (2013.01); *G06F 21/604* (2013.01); *G06F 21/62* (2013.01);
(Continued)

(58) Field of Classification Search
CPC ........ G06Q 20/35765; G06Q 20/3576; G06Q 20/367; G06F 3/0637; G06F 3/0643;
(Continued)

(56) References Cited

U.S. PATENT DOCUMENTS 7,546,640 B2 * 6/2009 Chang ................. G06F 21/6218
726/1
7,874,008 B2 * 1/2011 Chang ................. G06F 12/1458
726/1
(Continued)

FOREIGN PATENT DOCUMENTS

JP      2010-170208      8/2010
JP      2011-128994      6/2011
(Continued)

OTHER PUBLICATIONS

Akio Shimono et al.,"New Form of ICT with Focus on User Data", FUJITSU. 64, 1, pp. 102-110 (Jan. 2013), (9 pages) with English Abstract.
(Continued)

*Primary Examiner* — Tae K Kim
(74) *Attorney, Agent, or Firm* — Fujitsu Patent Center

(57) ABSTRACT

An application data storage area generation method that is executed by a processor includes, (a) generating an application data storage area including a data structure area where data of an application is stored, in a user data storage area shared by a plurality of user accounts, in response to a utilization request for the application, (b) generating, in the user data storage area, role information including a plurality of roles for which access control information on access to a data structure of the application is set, and (c) storing, in the user data storage area, information on association between the plurality of user accounts and the plurality of roles included in the role information.

6 Claims, 15 Drawing Sheets

(52) U.S. Cl.
CPC ............ *H04L 63/10* (2013.01); *H04L 63/101* (2013.01); *H04L 63/102* (2013.01)

(58) Field of Classification Search
CPC .... G06F 3/0673; G06F 21/62; G06F 21/6218; G06F 21/79; G06F 21/805; G06F 2221/2141; G06F 17/30339; G06F 21/604; G06F 21/6227; G06F 9/44505; H04L 63/101; H04L 63/10; H04L 63/102; H04L 63/105
See application file for complete search history.

(56) References Cited

U.S. PATENT DOCUMENTS

| | | | |
|---|---|---|---|
| 7,890,998 B2* | 2/2011 | Lu | G06F 21/6218 709/223 |
| 8,769,704 B2* | 7/2014 | Peddada | H04L 63/102 705/59 |
| 2004/0025162 A1* | 2/2004 | Fisk | G06F 3/0613 718/105 |
| 2008/0010685 A1* | 1/2008 | Holtzman | G06F 12/1483 726/27 |
| 2011/0270885 A1* | 11/2011 | Vieira | G06F 21/6218 707/785 |
| 2012/0047554 A1 | 2/2012 | Mihara et al. | |
| 2012/0278903 A1* | 11/2012 | Pugh | G06F 21/604 726/28 |
| 2013/0007891 A1* | 1/2013 | Mogaki | G06F 21/62 726/27 |
| 2013/0173798 A1* | 7/2013 | Micucci | H04L 67/1044 709/225 |
| 2013/0304762 A1 | 11/2013 | Shimono | |
| 2014/0330732 A1* | 11/2014 | Grignon | G06Q 50/01 705/319 |
| 2015/0006204 A1* | 1/2015 | Miyoshi | G06Q 10/06 705/3 |

FOREIGN PATENT DOCUMENTS

| | | |
|---|---|---|
| JP | 2011-197849 | 10/2011 |
| JP | 2012-069087 | 4/2012 |
| WO | 2012-077223 | 6/2012 |

OTHER PUBLICATIONS

International Search Report and Written Opinion of the International Searching Authority (Form PCT/ISA/210, Form PCT/ISA/237), mailed in connection with PCT/JP2013/075986 and dated Jan. 7, 2014 (5 pages).

Japanese Office Action dated Oct. 25, 2016 for corresponding Japanese Patent Application No. 2015-538693, with Partial English Translation, 5 pages.

* cited by examiner

FIG.11

R_TABLE ROLE TABLE (ROLE INFORMATION)

| ROLE NAME | APPLICATION DATA STORAGE AREA NAME | ASSOCIATED ROLE NAME |
|---|---|---|
| role1(CHIEF EXECUTIVE OFFICER) | APPLICATION X DATA | X/role1(CHIEF EXECUTIVE OFFICER) |
| role2(ACCOUNTING AND PERSONNEL STAFF MEMBER) | APPLICATION X DATA | X/role2(ACCOUNTING AND PERSONNEL STAFF MEMBER) |
| role3(GENERAL STAFF MEMBER) | APPLICATION X DATA | X/role3(GENERAL STAFF MEMBER) |

51_2 ROLE DATA

```
{
 "Roles": [
  {"Name": "role1"},
  {"Name": "role2"},
  {"Name": "role3"}
 ]
}
```

FIG.13

APLX_AATABLE ACCESS CONTROL INFORMATION TABLE
(ACCESS CONTROL INFORMATION)

| DIRECTORY | ACCESS AUTHORITY |
|---|---|
| dir1 | X/role1:all<br>X/role2:none<br>X/role3:none |
| dir1-1 | X/role1:all<br>X/role2:all<br>X/role3:none |
| dir2 | X/role1:all<br>X/role2:all,<br>X/role3:only individual |

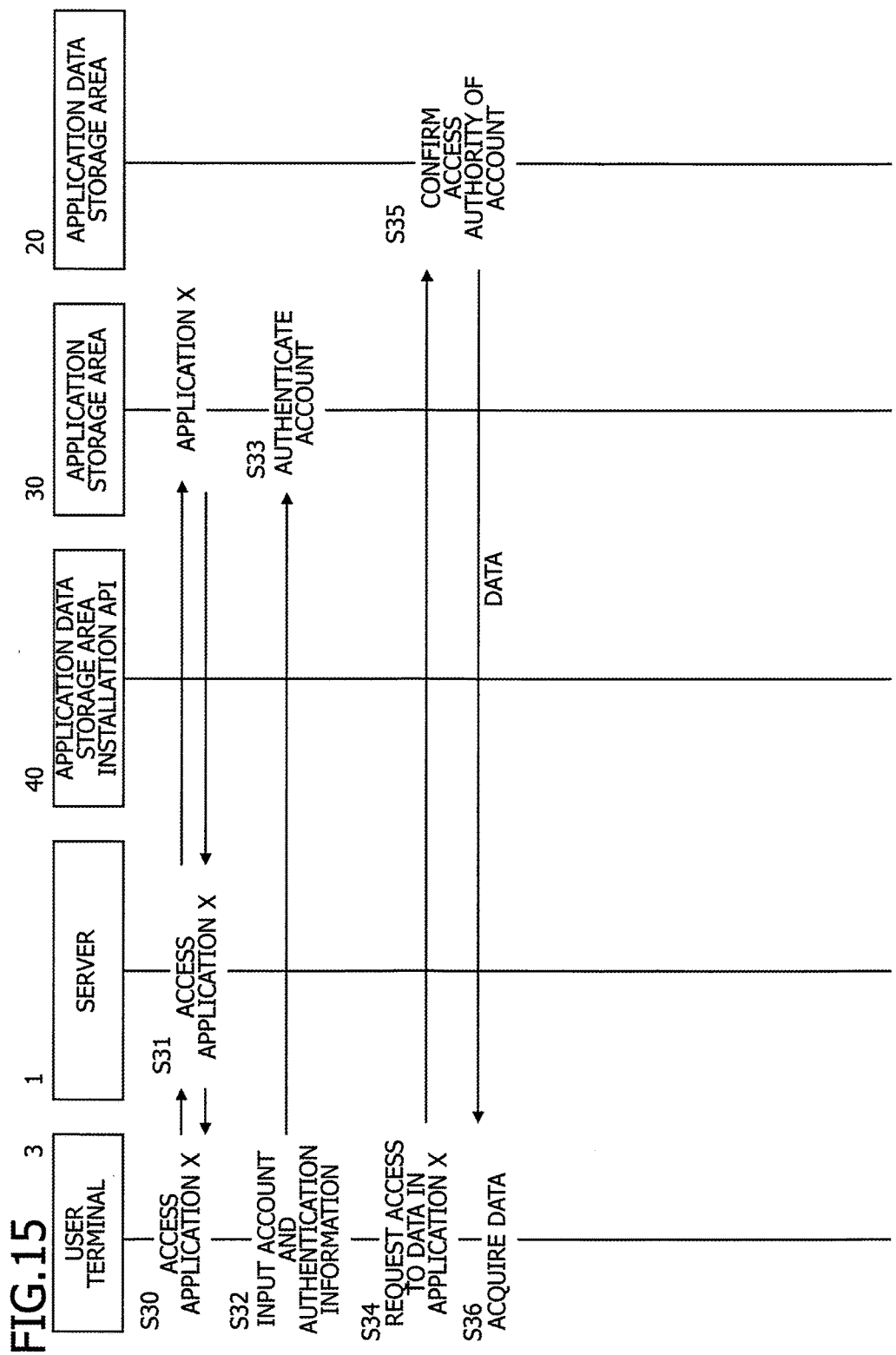

APPLICATION DATA STORAGE AREA GENERATION METHOD, APPLICATION DATA STORAGE AREA GENERATION APPARATUS, AND APPLICATION DATA STORAGE AREA GENERATION PROGRAM

CROSS-REFERENCE TO RELATED APPLICATION

This application is a continuation application of International Application PCT/JP2013/075986 filed on Sep. 26, 2013 and designated the U.S., the entire contents of which are incorporated herein by reference.

FIELD

The present invention relates to an application data storage area generation method, an application data storage area generation apparatus, and an application data storage area generation program.

BACKGROUND

A proposal has been made in which, when an individual or a corporation utilizes a plurality of terminals and a plurality of applications, data on the individual or the corporation be aggregated in a user data storage area reserved in a storage area on a cloud.

On the other hand, SaaS (Software as a Service) is a service that provides only functions of software such as applications to users. Web applications such as HTML5 which have recently prevailed need not be downloaded from a server to a terminal but may be executed based on access of a browser in the terminal to the server. Therefore, web applications can be utilized via various terminals regardless of the type of the terminal.

Providing the service of making the above-described user data storage portion available to the service on SaaS, as described above, allows aggregation of data on various applications utilized by the individual or the corporation.

CITATION LIST

Patent Literatures

Patent Literature 1: Japanese Laid-open Patent Publication No. 2011-197849
Patent Literature 2: International Publication Pamphlet No. WO 2012/077223

Non-Patent Literatures

Non-patent Literature 1: FUJITSU. 64, 1, p. 102-110 (January, 2013)

SUMMARY

When the above-described user data storage area is utilized, in an installation step of making an application available, a data storage area for the application (hereinafter referred to as an application data storage area) is generated (or installed) in the user data storage area. In this case, it is usual to set which users (application users) have access authorities for access to directories or files therein included in a directory structure for data that is generated in the application data storage area in the user data storage area for the corporation or the like.

However, in order to set the access authorities of the application users, a user-side administrator needs to analyze the directories and the files in a data area of the application. This leads to the need for many man-hours for setting the access authorities of the application users or makes appropriately setting the access authorities difficult.

According to an aspect of the embodiments, an application data storage area generation method being executed by a processor, the method includes, (a) generating an application data storage area including a data structure area where data of an application is stored, in a user data storage area shared by a plurality of user accounts, in response to a utilization request for the application, (b) generating, in the user data storage area, role information including a plurality of roles for which access control information on access to a data structure of the application is set, and (c) storing, in the user data storage area, information on association between the plurality of user accounts and the plurality of roles included in the role information.

The first aspect allows the access authority for access to the data area of the application to be easily or accurately set.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 11 is a diagram illustrating an example of role data 51_2 in the application data storage area definition body file 50 (APLX_DD) and an example of the role table R_TABLE generated based on the role data 51_2.

FIG. 13 is a diagram illustrating an example of the access control information table APLX_AATABLE.

FIG. 15 is a flowchart of the user's access to the data in the application data storage area.

DESCRIPTION OF EMBODIMENTS

Figure 1:
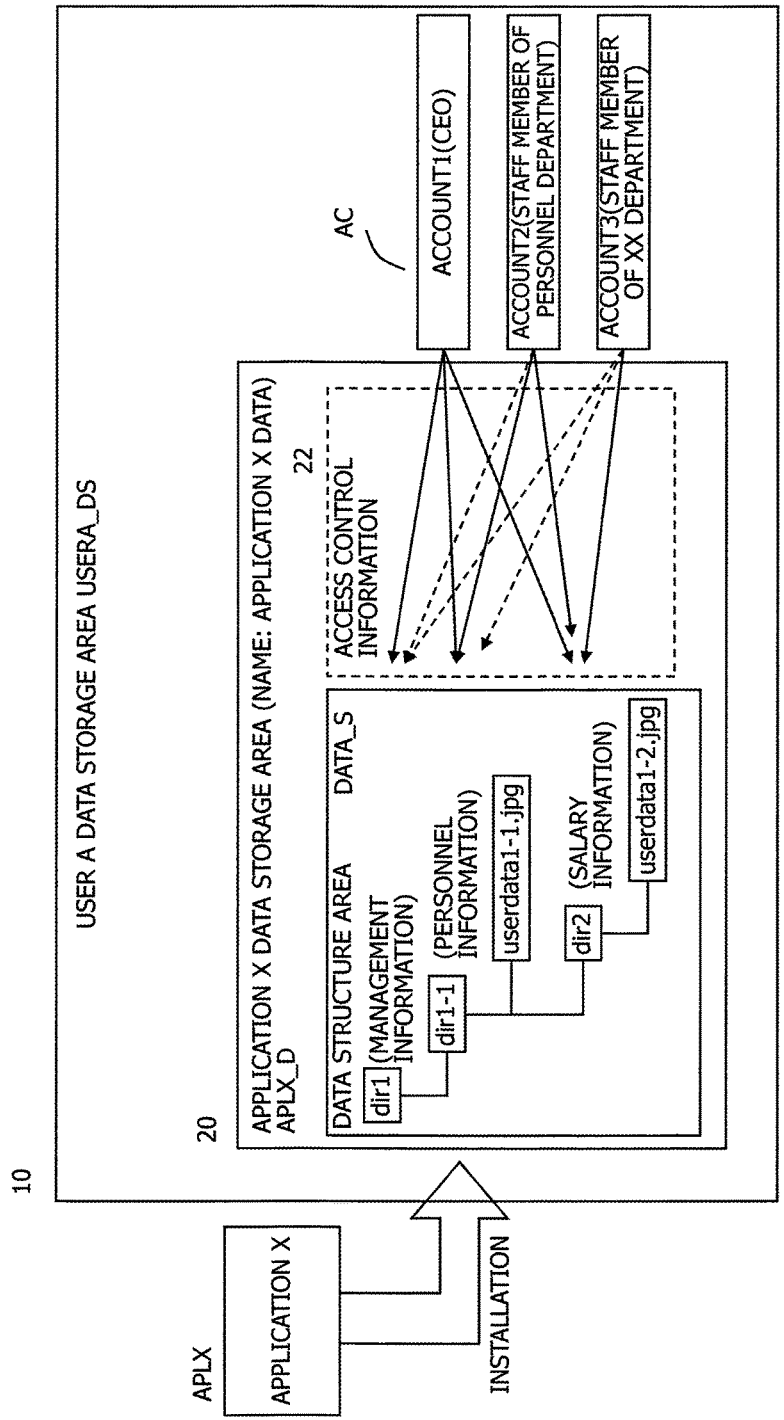
FIG. 1 is a diagram illustrating a user data storage area and an application data storage area.

FIG. 1 is a diagram illustrating a user data storage area and an application data storage area. A server that provides service for the user data storage area generates a user data storage area 10 depicted in FIG. 1 in a storage area of the server. When a user's terminal requests utilization of an application 30, the server, in an installation step of making the application 30 available, generates, in the user data storage area 10 of the server, an application data storage area 20 where data of the application APLX is stored. Subsequently, data resulting from execution of the application APLX by the user having accessed the application APLX is stored in the application data storage area 20 in the user data storage area 10. Data needed during the execution of the application APLX is read from the application data storage area 20.

In an example in FIG. 1, the application data storage area 20 is a data storage area for an application X that is accessed by the application X when the application X is executed from a terminal of a user A. Therefore, a data structure area DATA_S is generated in the application data storage area 20. In the example in FIG. 1, the data structure area DATA_S is a directory structure. However, the data structure area may be another data structure such as a relational database structure.

When the user A is a corporation, accounts AC of a plurality of employees of the corporation are set in the data storage area USERA_DS of the user A, which is the user data storage area 10. The employees of the accounts AC accesses the application X via terminals to execute the application X and to reference the data in the application X data storage area APLX_D. The data in the application X includes secret information, and thus, an administrator of the user A is requested to set, for each account AC, access control information 22 relating to the right to access the data structure area DATA_S in the application X data storage area APLX_D. In the example in FIG. 1, solid arrows on the access control information 22 indicate the possession of the access right, and dashed arrows on the access control information 22 indicate the lack of the access right.

However, the data structure area DATA_S of the application X is not generated so as to be customized for the attributes of the account AC of the user A. On the other hand, the administrator of the user A is not familiar with the data structure area DATA_S of the application X. Therefore, the administrator of the user A needs to analyze file information on the data structure area DATA_S or utilize the application X to check the substantial contents of the data structure area DATA_S, in order to set the access control information 22. This leads to the need for many man-hours for setting the access control information 22 or prevents the access control information 22 from being appropriately set.

[PRESENT EMBODIMENT]

Brief Description

Figure 2:
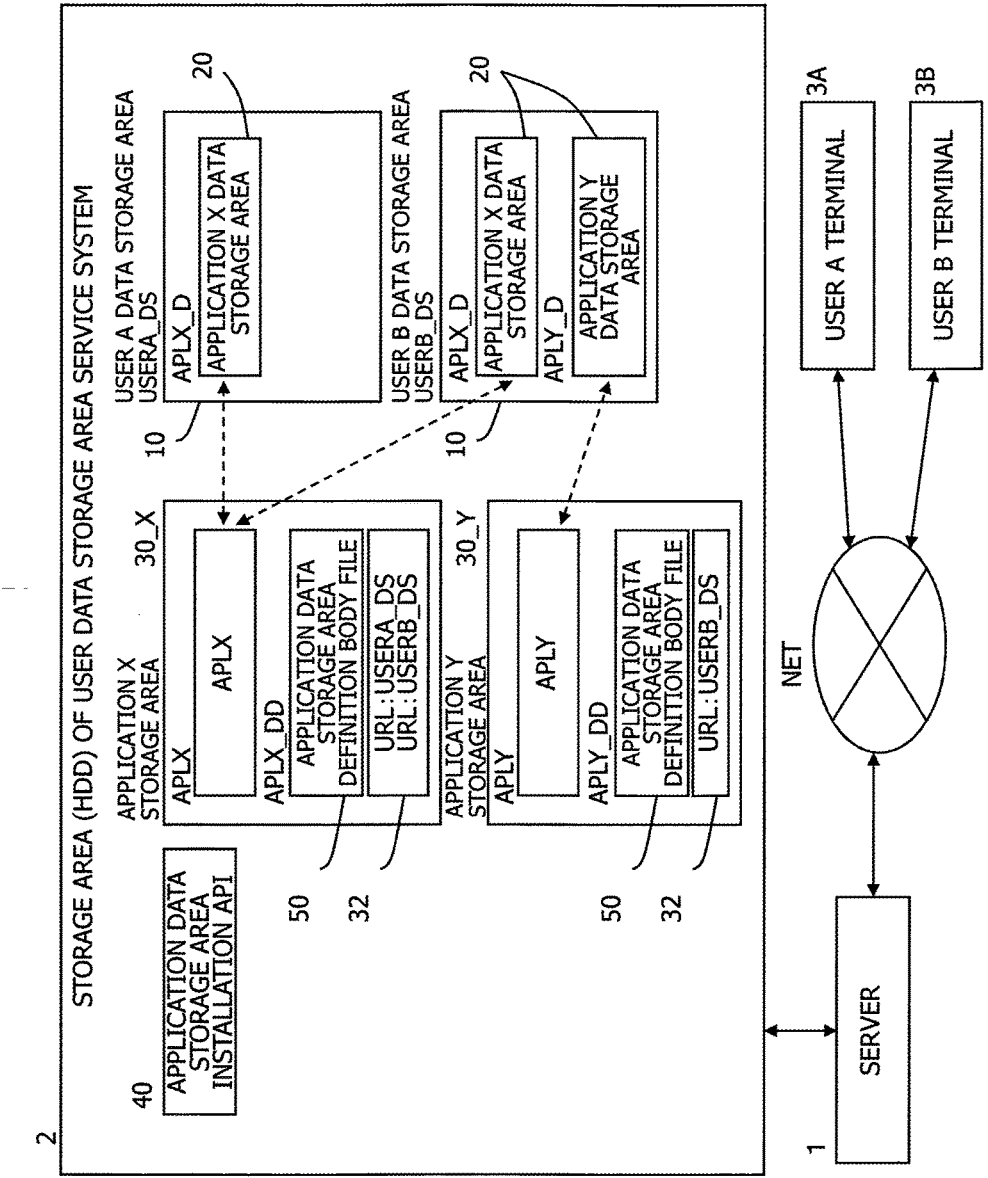
FIG. 2 is a diagram depicting a configuration of a user data storage area service system in the present embodiment.

FIG. 2 is a diagram depicting a configuration of a user data storage area service system in the present embodiment. A user data storage area administration server 1 (hereinafter simply referred to as a server 1) that provides service for the user data storage area executes a service management program not depicted in the drawings to provide user terminals 3A, 3B with service for the user data storage area via a network NET such as the internet.

In a storage area 2 in the user data storage area service system that can be accessed by the server 1, the user data storage area 10, which is provided for each of a plurality of users, has been generated. Moreover, in the storage area 2 in the user data storage area service system, an application storage area 30, where applications APLX, APLY utilized by a plurality of users are stored, has been generated. In the storage area 2, stored is an installation program 40 which generates the application data storage area 20 where data of a utilization target application is stored, when a user requests the utilization of the application. In an example in FIG. 2, the application data storage area installation program 40 is in the form of an API (Application Program Interface).

In an example in FIG. 2, the user A has generated and utilizes a data storage area USERA_DS of the user A in the storage area 2 through the terminal 3A via the server 1. A user B similarly has generated and utilizes a data storage area USERB_DS of the user B.

On the other hand, an application X storage are 30_X that stores the application X and an application Y storage are 30_Y that stores an application Y have been generated in the storage area 2. The applications X, Y are WEB applications, for example, HTML5 and are executed by being accessed and downloaded on browsers in the terminals 3A, 3B.

The user A can receive a service of utilizing the application X by accessing the application X in the application X storage area 30_X to request utilization of the application X, through the terminal 3A via the server 1. In response to the utilization request for the application X from the terminal 3A of the user A, a URL address "USERA_DS" that is access information for the data storage area USERA_DS of the user A is set in a user data storage area setting portion 32 in the application X storage area 30_X. Furthermore, the data storage area 20 (APLX_D) for the application X is set in the user A data storage area 10 (USERA_DS).

Thus, when the user A accesses and executes the application X through the terminal 3A of the user A, the application X accesses the application X data storage area 20 (APLX_D) in the user A data storage area 10 (USERA_DS), stores generated data in the application X data storage area 20 (APLX_D), and reads, from the application X data storage area 20 (APLX_D), data to be referenced. Consequently, whichever terminal is used by the user A to execute the application X, data is stored in the application X data storage area 20 (APLX_D) in the same user A data storage area 10 (USERA_DS) or data in the application X data storage area 20 (APLX_D) in the same user data storage area 10 (USERA_DS) is referenced.

The user B similarly makes the application X and the application Y available. As a result, a URL address "USERB_DS" that is access information for the data storage area 10 (USERB_DS) of the user B has been set in the user data storage area setting portions 32 in the application X storage area 30_X and in the application Y storage area 30_Y, while the data storage area 20 (APLX_D) for the application X and the data storage area 20 (APLY_D) for the application Y have been generated in the user B data storage area 10 (USERB_DS).

Thus, when the user B accesses and executes the application X through the terminal 3B of the user B, the application X accesses the application X data storage area 20 (APLX_D) in the user B data storage area 10 (USERB_DS), stores generated data in the application X data storage area 20 (APLX_D), and reads, from the application X data storage area 20 (APLX_D), data to be referenced. Similarly, when the user B accesses and executes the application Y through the terminal 3B, the application Y accesses the application X data storage area 20 (APLX_D) in the user B data storage area USERB_DS, and executes read or write to or on the application Y data storage area 20 (APLY_D). Therefore, whichever of the application X and the application Y the user B executes on whichever terminal, data is stored in the application X data storage area 20 (APLX_D) or application Y data storage area 20 (APLY_D) in the same user B data storage area 10 (USERB_DS) or data in the application X data storage area 20 (APLX_D) or application Y data storage area 20 (APLY_D) in the same user B data storage area 10 (USERB_DS) is referenced.

In the present embodiment, in the storage area 2, an application data storage area installation program 40 is stored which allows, in an installation step of making the application available, the application data storage area 20 to be generated (installed) in each user data storage area 10. Moreover, in each application storage area 30, an application data storage area definition body file 50 (APLX_DD, APLY_DD) is stored which is referenced to generate the corresponding application data storage area.

In the present embodiment, the application data storage area definition body file 50 includes data structure information in the application data storage area, role information with being set access control information on access to a data structure, and access control information that defines the access right for each role for the data structure. Here, when the user is a corporation, the role is a general name indicative of the role of an account user in the corporation such as a post, a department, and a section. When the user is an individual, the role is a general name for, for example, the role of the account such as business use or individual use or the role of the individual in a private society such as a family member or a friend.

As described above, in the present embodiment, in a service that provides the user data storage area where data areas for a plurality of applications are aggregated for each user in connection with SaaS, in particular, the process of generating the application data storage area is executed in the application installation step of making the application available, as described above.

Figure 3:
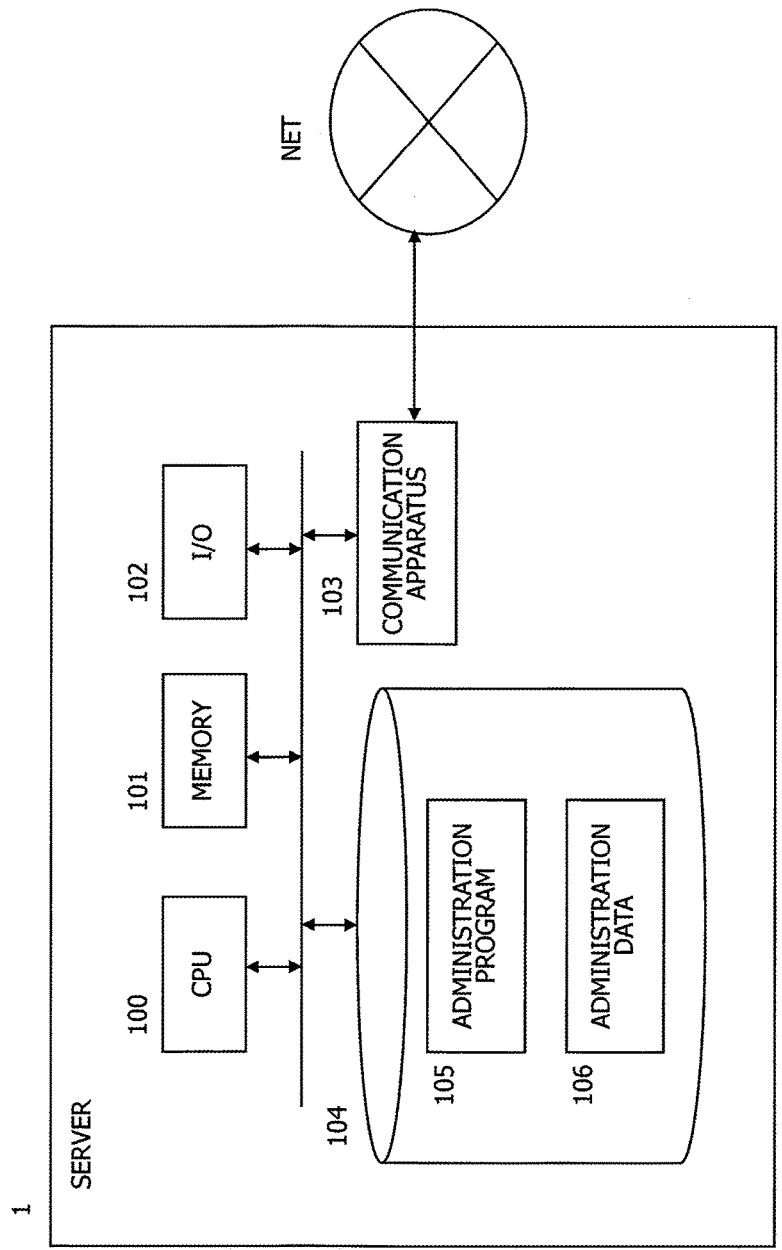
FIG. 3 is a configuration diagram of the server in the present embodiment.

FIG. 3 is a configuration diagram of the server in the present embodiment. An administration server 1 has a CPU 100, a memory 101, an I/O apparatus 102, a communication apparatus 103, and a storage area 104 such as an HDD or an SDD in which programs and data are stored. In the storage area 104, an administration program 105 that executes an administration process for a service of providing the user data storage area and administration data 106 are stored.

Figure 4:
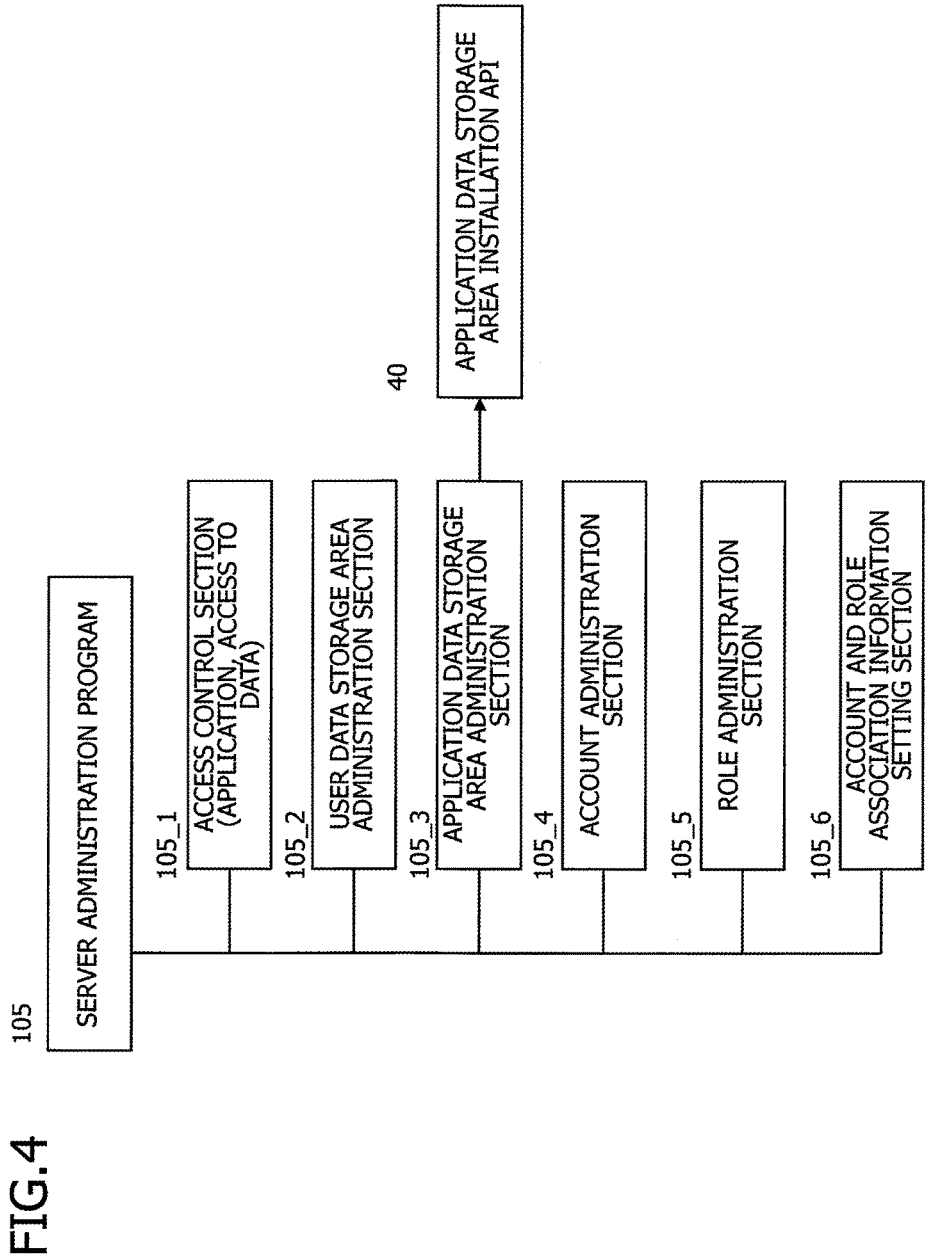
FIG. 4 is a diagram illustrating functions of a server administration program executed by the CPU that is a processor in the server 1.

FIG. 4 is a diagram illustrating functions of a server administration program executed by the CPU that is a processor in the server 1. The administration program 105 is executed by the CPU 100 to allow the CPU 100 to implement an access control section 105_1 that controls access from the user terminal to the application. In the accesses from the user terminal to the application, the access control section 105_1 provides access to data in the application data storage area 20 generated in the user data storage area 10.

The administration program 105 is executed by the CPU 100 to allow the CPU 100 to implement a user data storage area administration section 105_2 that generates the user data storage area 10 in the storage area 104 of a user data storage area system and that maintains and administers the user data storage area 10, based on a contract with the user. Moreover, the administration program 105 is executed by the CPU 100 to allow the CPU 100 to implement an application data storage area administration section 105_3 that generates, in response to a utilization request for an application from the user, the data storage area 20 for the application in the user data storage area 10 and that maintains and administers the data storage area 20. The application data storage area administration section 105_3 further allows the CPU 100 to execute the application data storage area installation program 40 to generate the above-described application data storage area 20.

Moreover, the administration program 105 is executed by the CPU 100 to allow the CPU 100 to implement an account administration section 105_4 that administers a plurality of accounts that shares the user data storage area 10. When a contractor of the user data storage area 10 is a corporation, the plurality of accounts is assigned to the employees of the corporation, as described above. Each of the employees of the corporation accesses and executes the application through the terminal based on the account, and accesses the application data storage area 20 in the user data storage area 10 via the application to reference the data in the application. When the contractor of the user data storage area 10 is an individual, the plurality of accounts corresponds to the individual's roles, for example, a role in business and a role in a private life and may further correspond to an unrelated person in a private life such as a family member or a friend.

Furthermore, the administration program 105 is executed by the CPU 100 to allow the CPU 100 to implement a role administration section 105_5 that administers a plurality of roles set for each application. The plurality of roles set for each application is set in the user data storage area 10 as roles associated with identification information in the respective application data storage areas 20. Therefore, even if the roles set in the user data storage area 10 are the same general name such as "chief executive officer" or "general staff member", the roles are considered to be different when stored in different application data storage areas 20.

Figure 5:
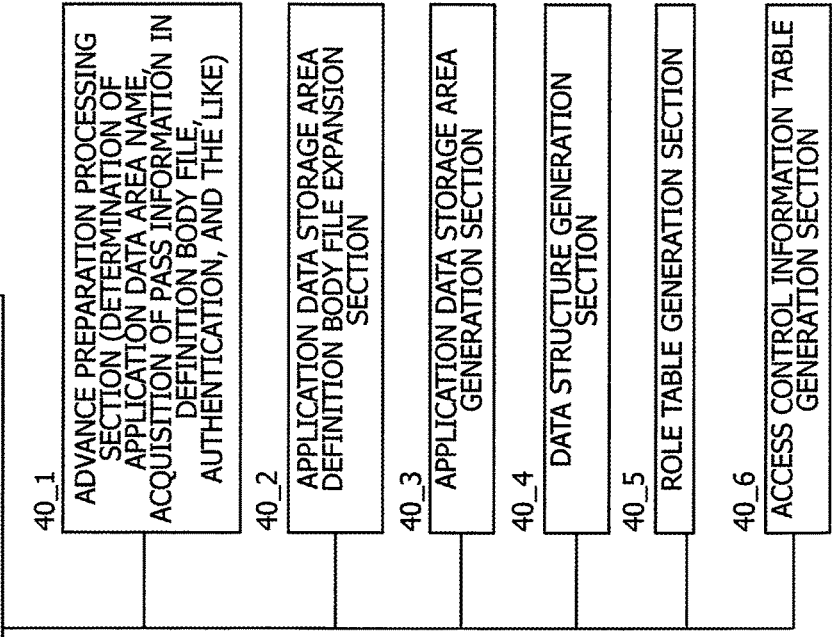
FIG. 5 is a diagram depicting functions of the application data storage area installation program 40 executed by the server 1.

Moreover, the administration program 105 is executed by the CPU 100 to provide the CPU 100 with an information setting section 105_6 that receives, from the terminal, information on association of a plurality of user accounts with the plurality of roles included in a role table generated by the application data storage area installation program 40 in FIG. 5 and that stores the information in the user data storage area 10.

FIG. 5 is a diagram depicting functions of the application data storage area installation program 40 executed by the server 1. The application data storage area installation program 40 is executed by the CPU 100 to allow the CPU 100 to implement an advance preparation processing section 40_1 that determines the name of the application data storage area 20 based on an input from the user terminal, that acquires access information (pass information) of the application data storage area definition body file 50, from the application storage area 30 for the application for which utilization has been requested, and that authenticates an installation authority as needed.

Moreover, the application data storage area installation program 40 is executed by the CPU 100 to allow the CPU 100 to implement an application data storage area definition body file expansion section 40_2 that acquires the definition body file 50 from the application storage area 30 based on the acquired pass information of the definition body file and that expands the definition body file 50 in the user data storage area 10. The application data storage area installation program 40 is executed by the CPU 100 to allow the CPU 100 to implement an application data storage area generation section 40_3 that generates the application data storage area 20, a data structure generation section 40_4 that generates the data structure area DATA_S in the application data storage area 20, a role table generation section 40_5 that generates a role table R_TABLE in the user data storage area 10, and an access right table generation section 40_6 that generates an access control information table AATABLE in the application data storage area 20. See FIG. 8.

[Installation Process for the Application and the Application Data Storage Area]

Figure 6:
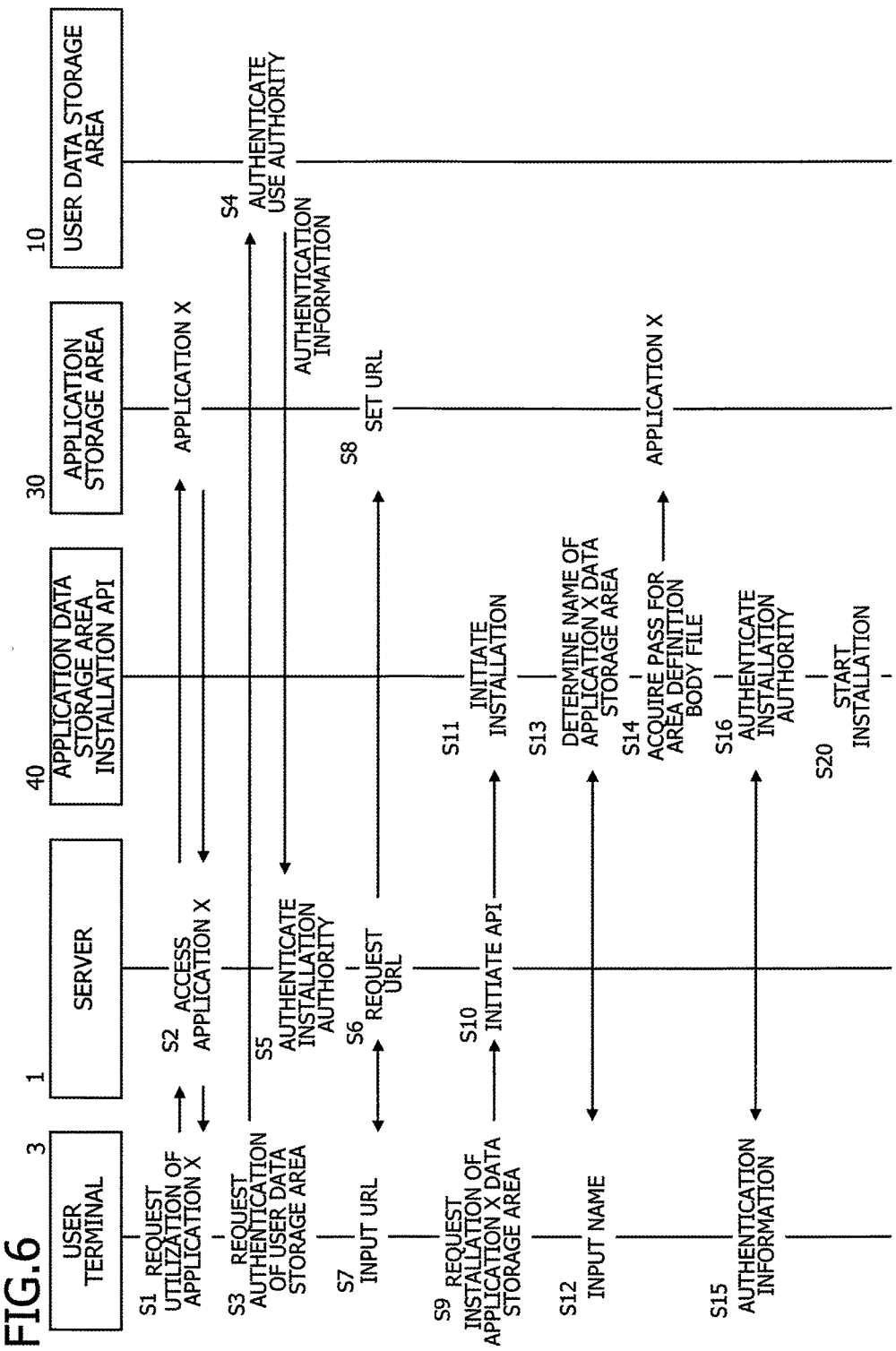
FIG. 6 is a flowchart illustrating a process procedure from a utilization request for the application X from the user terminal 3A, 3B until completion of installation of the application data storage area.
Figure 7:
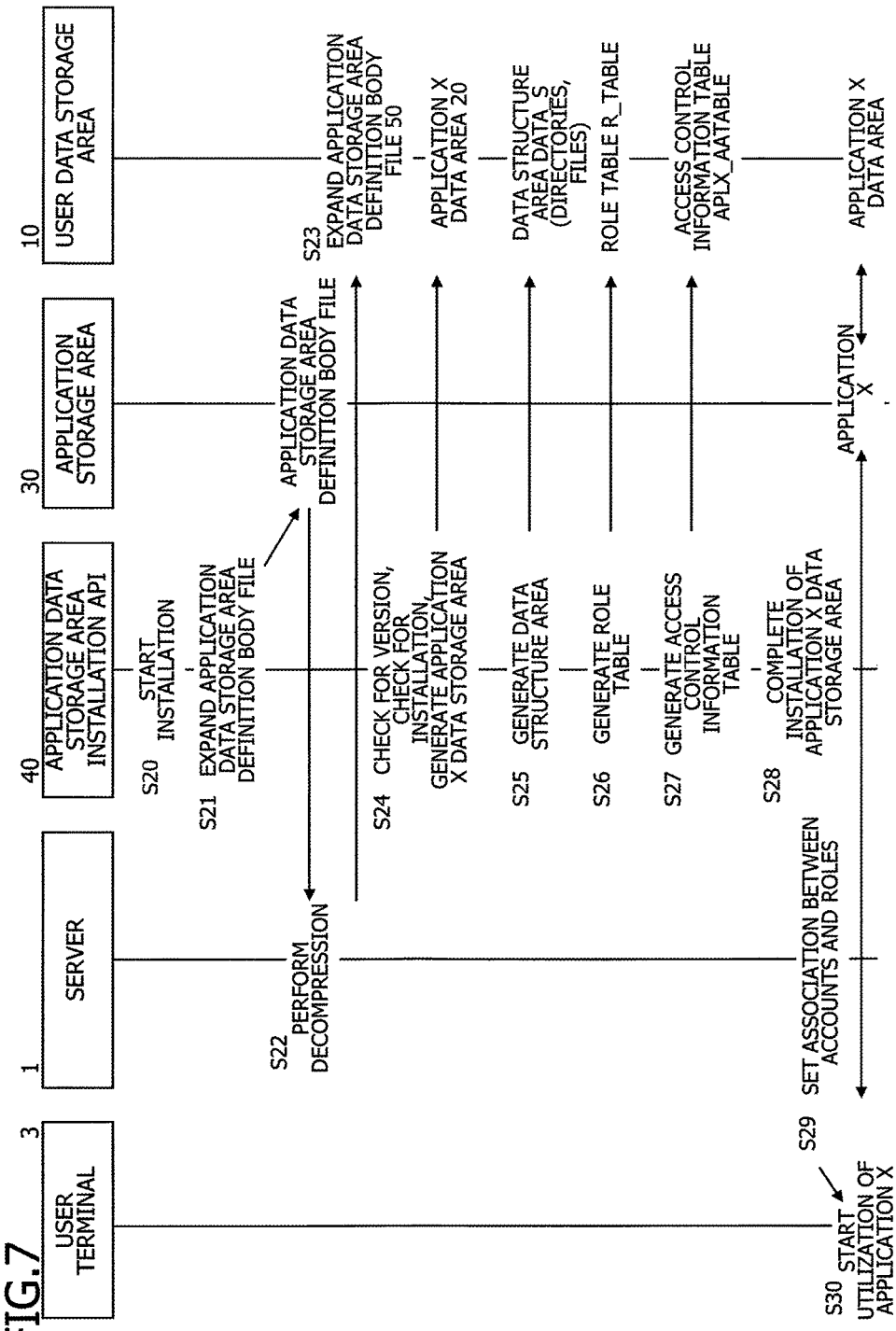
FIG. 7 is a flowchart illustrating a process procedure from a utilization request for the application X from the user terminal 3A, 3B until completion of installation of the application data storage area.

FIG. 6 and FIG. 7 are flowcharts illustrating a process from a utilization request for the application X from the user terminal 3A, 3B until completion of installation of the application data storage area. In a precondition, the user A or B has already generated the user data storage area 10 in the storage area 2, and accounts have already been assigned to a plurality of employees of the user.

As depicted in FIG. 6, first, the user terminal 3 accesses the application X via the server 1 (S1, S2). In response to this utilization request, the access control section 105_1 of the administration server 1 executes, on the application X, a process of enabling utilization of an application, for example, user registration or the like, though this is not depicted in the drawings.

The user terminal 3 requests authentication of the user data storage area 10 via the application data storage area administration section 105_3 of the administration server 1 (S3), and acquires authentication information from the user data storage area 10 (S4). Thus, the application data storage area administration section 105_3 of the administration server 1 performs, to the user terminal, authentication of the installation authority of the application based on the utilization authority for the user data storage area 10 (S5). The authentication allows acceptance of installation of the application data storage area 20 for the application X in the user data storage area 10.

When, in response to a request from the application data storage area administration section 105_3 of the administration server 1 (S6), the user terminal 3 inputs a URL address that is access information for the user data storage area 10 (S7), the application data storage area administration section 105_3 of the administration server 1 sets the access information (URL address) for the user data storage area 10 in the user data storage area setting portion 32 in the application X storage area 30 for the application X for which utilization has been requested (S8). Thus, a source of access to the user data storage area 10, where the data on the user having requested utilization of the user data storage area 10 is stored, is set in the application X.

Then, the application data storage area installation program (API) 40 is initiated which installs the data storage area 20 for the application X (S11). The initiation is performed in response to the request for installation of the application X data storage area from the user terminal 3 (S9). Alternatively, the application data storage area administration section 105_3 of the administration server 1 may automatically initiate the application data storage area installation program (API) 40 (S10) after the above-described access information (URL address) is set.

The installation program (API) 40 allows the user terminal 3 to input the name of the application X data storage area 20 (S12), and determines the name (S13). Moreover, the installation program (API) 40 accesses the application X storage area 30 where the application X for which utilization has been requested is stored, to acquire the pass information of the application data storage area definition body file 50 stored in the application X storage area 30 (S14). The installation program 40 has been initiated directly or indirectly by the application data storage area administration section 105_3 of the administration server 1 in response to the utilization request for the application X from the user. Therefore, the installation program 40 has known which the definition body file 50 of the application storage areas 30 needs to be acquired, and can acquire the pass information of the above-described definition body file 50.

The installation program (API) 40 then allows the user terminal 3 to input authentication information that authenticates an authority to utilize the user data storage area 10 (S15) to execute a process of authenticating the installation authority (S16). The authentication process has already been executed by the application data storage area administration section 105_3 of the administration server 1 (S5) and may thus be omitted. Alternatively, the above-described process S5 may be omitted and replaced with the authentication process (S16) executed by the installation program (API) 40.

As depicted in FIG. 7, the installation program (API) 40 starts an installation process of generating the application X data storage area 20 (S20).

Based on the above-described acquired pass information, the installation program 40 acquires the application data storage area definition body file 50 (APLX_DD) for the application X from the application X storage area 30_X, allows the administration server 1 to decompress the definition body file 50 (S22), and expands and stored the decompressed definition body file 50 (APLX_DD) in the user data storage area 10 (S23).

Figure 8:
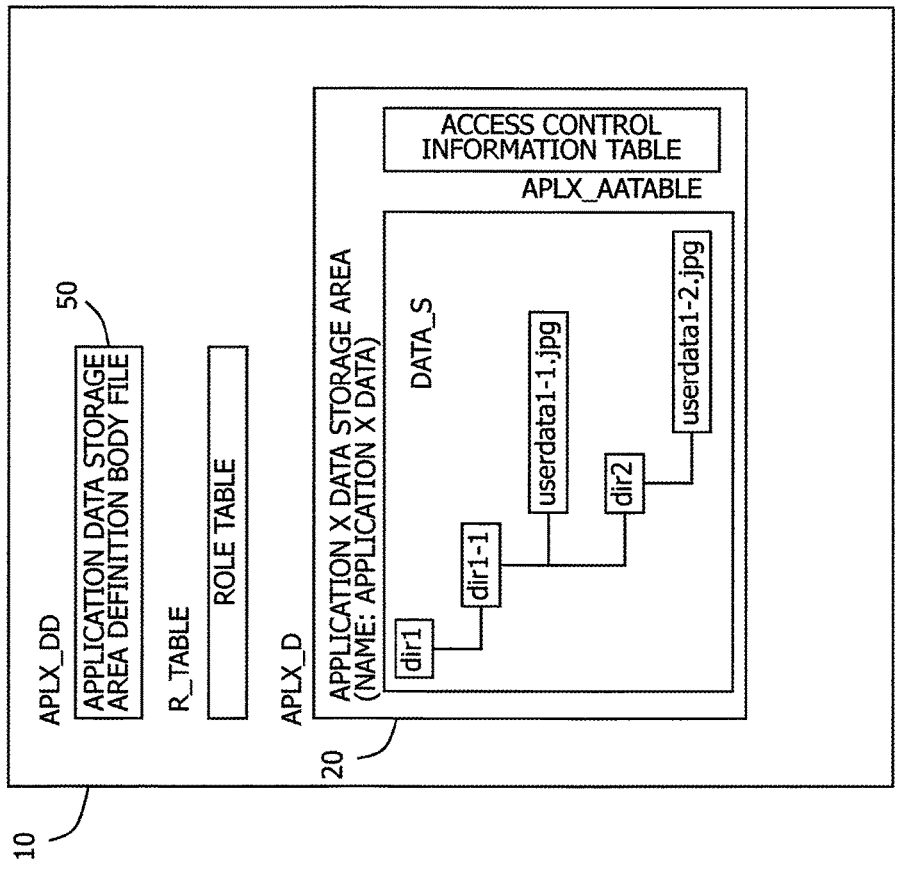
FIG. 8 is a diagram depicting a configuration of the user data storage area.

FIG. 8 is a diagram depicting a configuration of the user data storage area. FIG. 8 is an example of the data storage area 10 (USERA_DS) of the user A. The data storage area definition body file 50 (APLX_DD) for the application X has been stored in the user A data storage area 10 (USERA_DS) through the process S23 executed by the above-described installation program 40. Moreover, in the user A data storage area 10 (USERA_DS), a role table R_TABLE and the data storage area 20 (APLX_D) for the application X are generated by the installation process described below.

Figure 9:
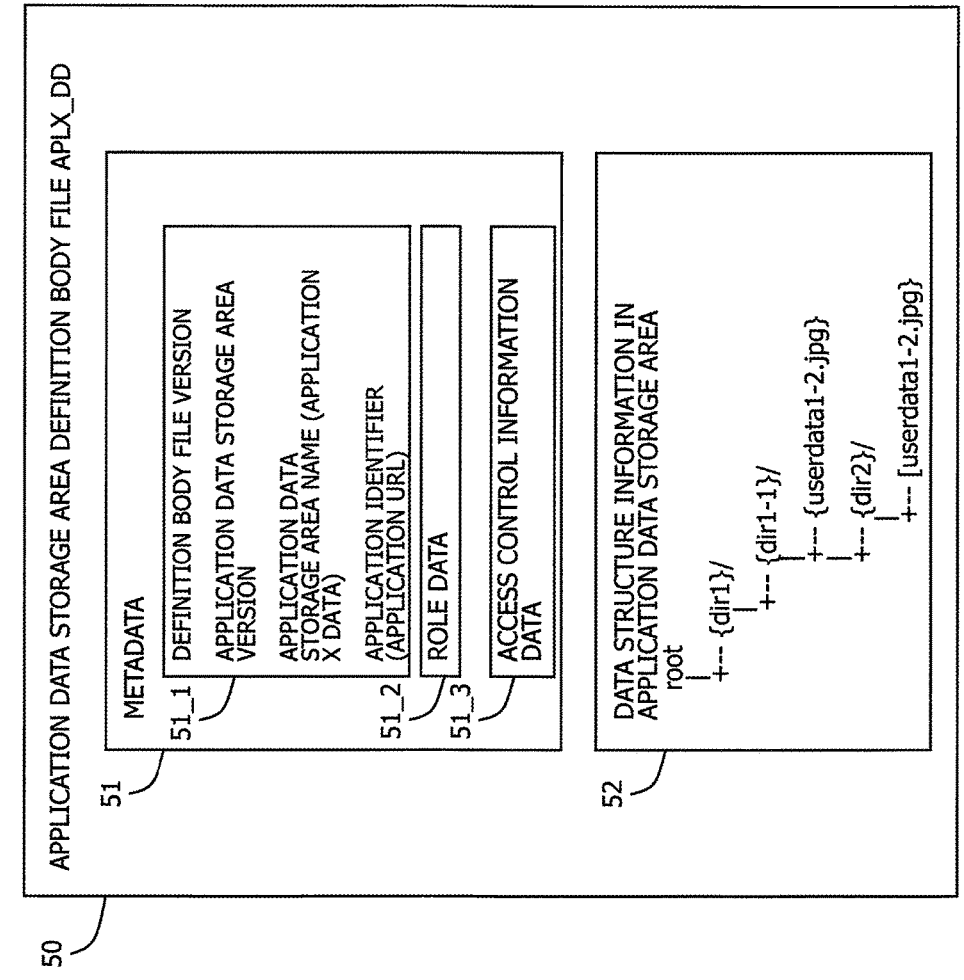
FIG. 9 is a diagram depicting a configuration of the application data storage area definition body file.

FIG. 9 is a diagram depicting a configuration of the application data storage area definition body file. The application data storage area definition body file 50 (APLX_DD) for the application X has metadata 51 and a data structure information 52 for the application data storage area. The metadata 51 includes administration data 51_1, role data 51_2, and access control information data 51_3.

The role data 51_2 includes information (role1, role2, role3) on all the roles defined in the application X as depicted in FIG. 11. The access control information data 51_3 includes authorities for access of the roles to directories and files in the data structure DATA_S of the application data storage area 20.

The administration data 51_1 includes version information on the definition body file, version information on the application data storage area targeted by the definition body file, application data storage area name information, and the URL address of the application, which is application identification information. In this example, the name of the application data storage area 20 has been determined to be "application X data" that is input through the terminal in the above-described steps S12, S13.

Furthermore, the data structure information 52 of the application data storage area 20 includes, for example, structure information for a root directory root and lower directories, and files in the directories. Additionally, if the data structure is a relational database, the data structure information 52 includes the structure of the database.

With reference back to FIG. 7, the process in which the installation program 40 generates the application X data storage area 20 will be described in further detail. The installation program 40 checks the definition body file version and the application data storage area version in the administration data 51_1 in the metadata 51 in the application data storage area definition body file 50 (APLX_DD) in FIG. 9 to confirm that the definition body file is appropriate, and checks whether or not the application X data storage area 20 (APLX_D) has been generated (installed) in the user data storage area 10 (USERA_DS) to confirm that the application X data storage area 20 (APLX_D) has not been generated. Upon obtaining the confirmations, the installation program 40 generates the application X data storage area 20 (APLX_D) in the user data storage area 10 (USERA_DS) (S24). FIG. 8 depicts the generated application X data storage area 20 (APLX_D). When any of the confirmations fails to be obtained, an error is returned to the user terminal to reject generation of the application data storage area.

Then, the installation program 40 generates the data structure area DATA_S in the application X data storage area 20 (APLX_D) based on the data structure information 52 of the application data storage area in the application data storage area definition body file 50 (APLX_DD) in FIG. 9 (S25). The result is depicted in FIG. 8.

Figure 10:
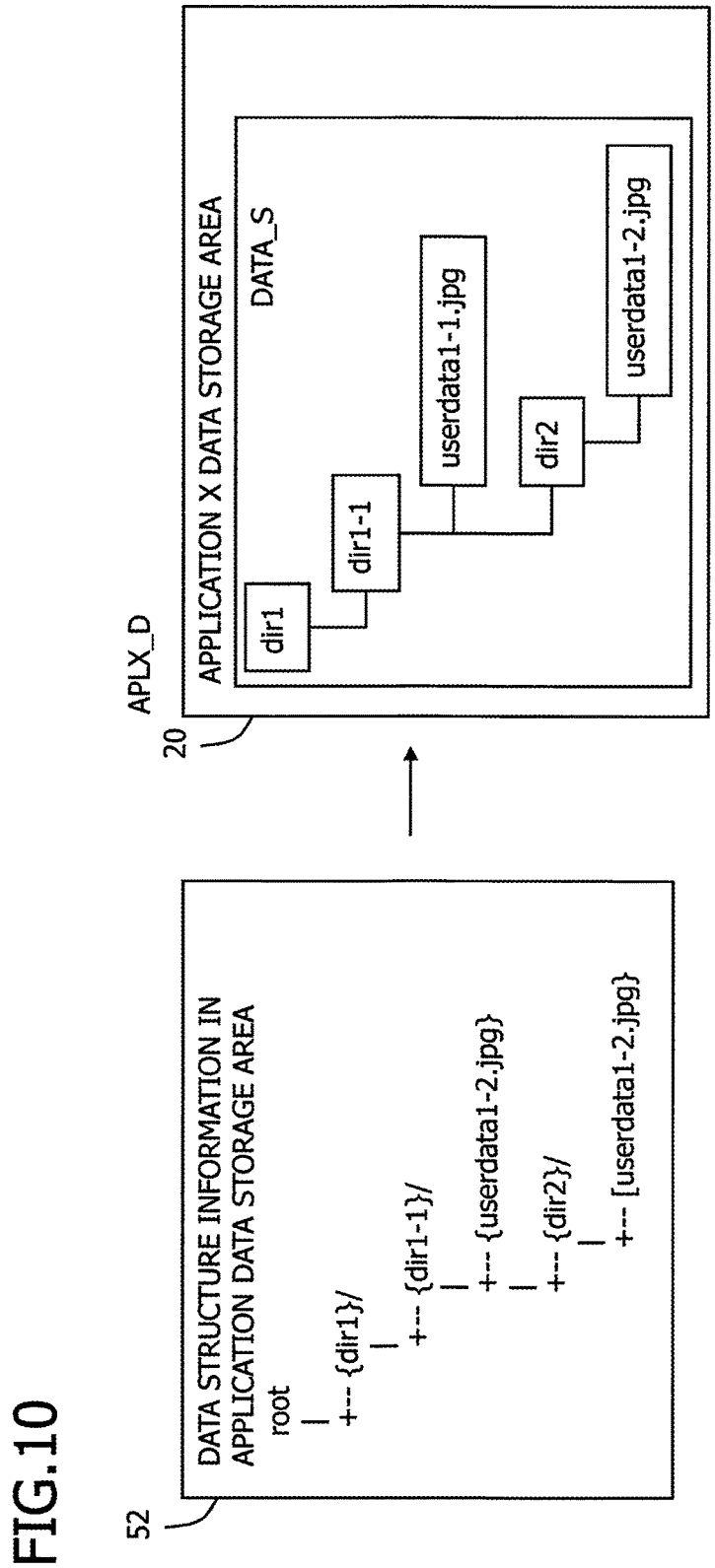
FIG. 10 is a diagram depicting an example of data structure information on the application data storage area and an example of the data structure area in the application X data storage area generated based on the data structure information.

FIG. 10 is a diagram depicting an example of data structure information on the application data storage area and an example of the data structure area in the application X data storage area generated based on the data structure information. The data structure information 52 in FIG. 10 has information on the directory structures of the root directory root and the lower directories and on the data files stored in the directories. The installation program 40 generates the data structure area DATA_S in the application data storage area 20 (APLX_D) based on the data structure information 52. In this example, the generated data structure area DATA_S has directories dir1, dir1-1, and dir2, a file userdata1-1.jpg stored in the directory dir1-1, and a file userdata102.jpg stored in the directory dir2.

With reference back to FIG. 7, the installation program 40 generates the role table R_TABLE in the user A data storage area 10 (USERS_DS) based on the role data 51_2 in the metadata 51 in the application data storage area definition body file 50 (APLX_DD) in FIG. 9 (S26). The result is depicted in FIG. 8. If a role table having role information on another application has already been generated, the role information on the application X is added to the role table. Thus, the administrator can associate the role information for each application with a plurality of accounts sharing the user A data storage area 10 (USERA_DS).

FIG. 11 is a diagram illustrating an example of role data 51_2 in the application data storage area definition body file 50 (APLX_DD) and an example of the role table R_TABLE generated based on the role data 51_2. The role data 51_2 in the application data storage area definition body file for the application X has role information in the application X. An example in FIG. 11 includes three role names role1, role2, role3. In contrast, in the role table R_TABLE, the three role names role1, role2, role3 and the application data storage area name "Application X Data" are associated each other. As a result, the associated role names are X/role1, X/role2, X/role3. Thus, associating the role names with the identification information (X, Y) of the application data storage area 20 results in role names that are unique within the user data storage area 10 even when different applications have the same role name.

As depicted in FIG. 11, the role table R_TABLE includes role information with role names (role1, role2, role3) associated with the application data storage area name (X, Y). Therefore, the role table R_TABLE need not be in table form but may be role information simply having associated role names (X/role1, X/role2, X/role3). The role table R_TABLE and the role information are substantially the same.

Figure 12:
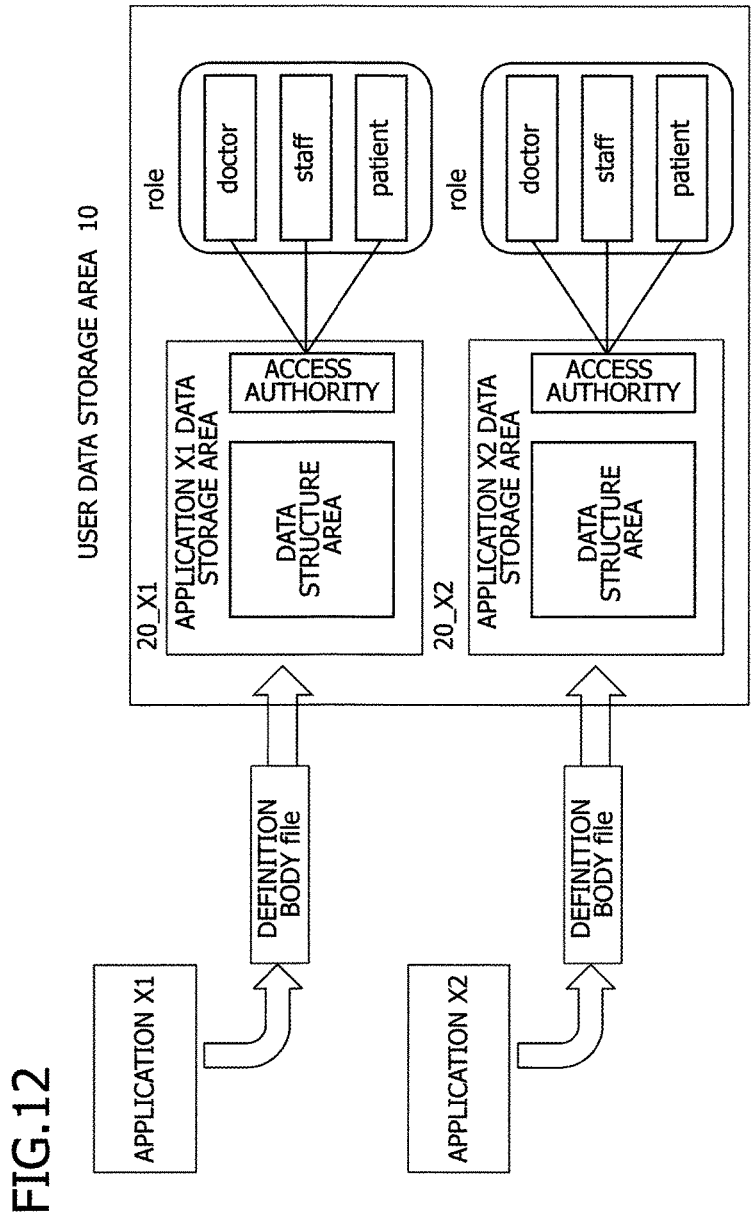
FIG. 12 is a diagram illustrating an example in which a plurality of roles role is defined in each of a plurality of application data storage areas.

FIG. 12 is a diagram illustrating an example in which a plurality of roles role is defined in each of a plurality of application data storage areas. As depicted in FIG. 12, the roles in the application X data storage area 20_X1 may have the same names as those in the application Y data storage area 20_X2, for example, "doctor", "staff", and "patient". In that case, in a common role table generated for the plurality of application data storage areas, the role names can be uniquely distinguished from one another by associating the role names (role1, role2, role3) with the identification information (X1, X2) in each application data storage area (20_X1, 20_X2).

Figure 14:
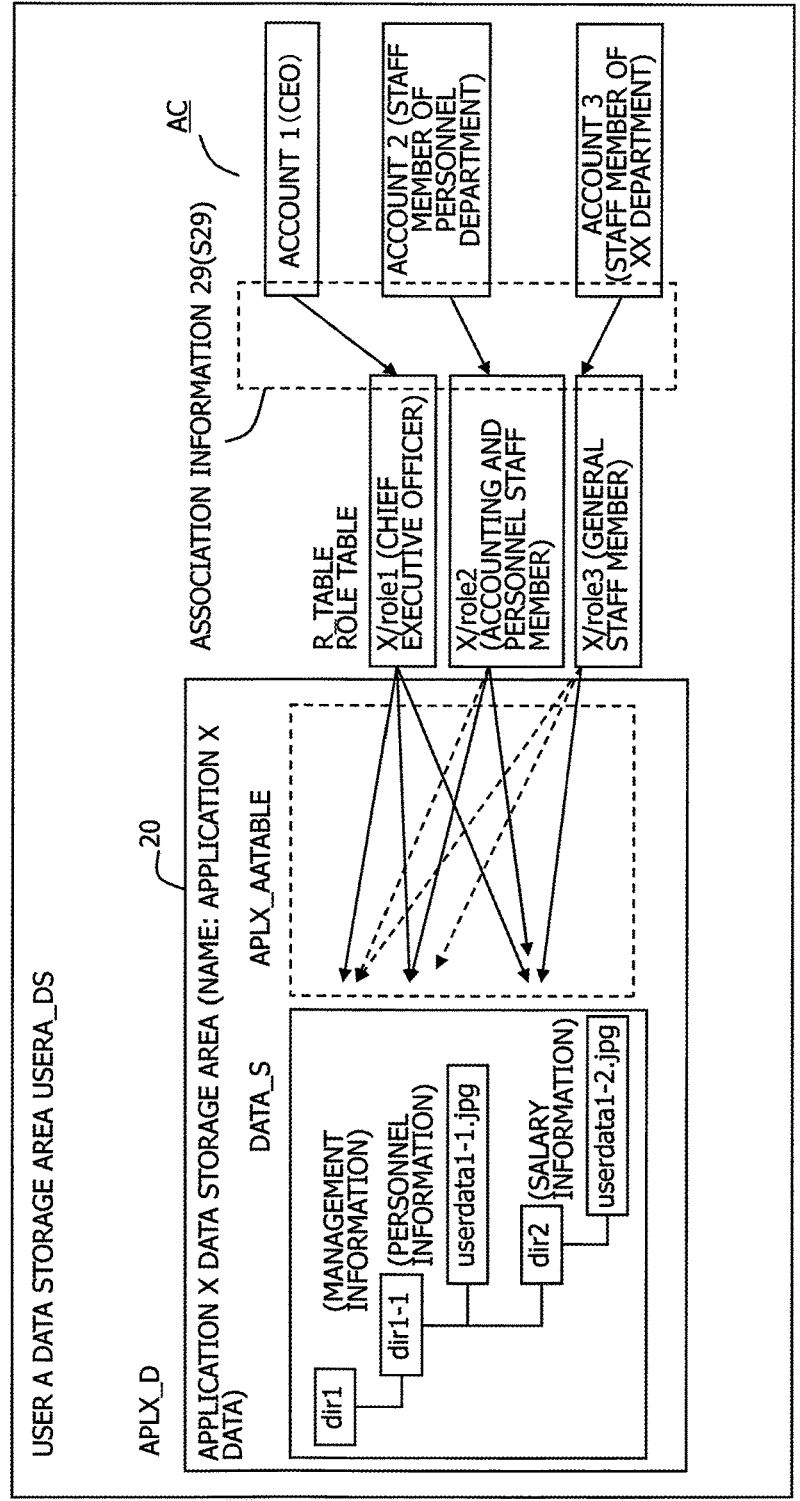
FIG. 14 is a diagram illustrating a process of associating the accounts with the roles in the role table.

With reference back to FIG. 7, the installation program 40 generates an access control information table APLX_AATABLE based on the access control information data 51_3 in the application data storage area definition body file 50 (APLX_DD) in FIG. 9 and the role table R_TABLE in FIG. 11 (S27). The result is depicted in FIG. 8 or FIG. 14.

FIG. 13 is a diagram illustrating an example of the access control information table APLX_AATABLE. In this example, the access authorities of the roles are set for three directories in the data structure in the data structure area DATA_S. In the role table R_TABLE in FIG. 11, the three role names role1, role2, role3 in the application X are associated with the application data storage area name "Application X Data". Thus, also in the access control information table APLX_AATABLE, the three role names role1, role2, role3 in the application X are associated with one another using "X" in the application data storage area name "Application X Data", and the resultant role names are X/role1, X/role2, X/role3.

What access authorities the associated roles (X/role1, X/role2, X/role3) have for each directory is set in the access control information table APLX_AATABLE. For example, for the directory dir1, all of the role X/role 1 has an access authority, whereas the role X/role2 and the role X/role3 have no access authority.

The access control information table need not be a table but may be access control information having the access authorities of the associated roles for directories or the like.

With reference back to FIG. 7, the installation program 40 completes the installation process of generating the application X data storage area (S28). Finally, the administrator of the user associates the plurality of accounts with the associated roles in the role table R_TABLE through the user terminal 3 (S29). This association may be performed manually or using a generated association tool and is stored in the user data storage area 10 (USERA_DS).

FIG. 14 is a diagram illustrating a process of associating the accounts with the roles in the role table. When the installation process for the application data storage area by the installation program 40 is completed, all the information other than the association information 29 provided by the administrator as depicted in FIG. 14 has been generated. That is, the role table R_TABLE and the application X data storage area 20 have been generated in the user A data storage area 20. The data structure area DATA_S and the access control information table APLX_AATABLE specifying the access authorities of the roles in the role table R_TABLE for the data structure area DATA_S have been generated in the application X data storage area 20. The user A data storage area 20 is shared by the plurality of accounts AC.

The roles in the role table R_TABLE are general names for posts, departments, and sections in a corporation or the roles with descriptions of the posts, departments, and sections in a corporation, for each application. On the other hand, since the accounts AC correspond to the employees or general staff members of the corporation of the user, the administrator can know attribute information on the posts, departments, and sections of the accounts in the user corporation. Therefore, the administrator can easily associate the accounts AC with the roles in the role table R_TABLE most appropriately corresponding to or approximating the attribute information on the posts, departments, and sections of the accounts AC in the user corporation.

Thus, after the installation process for the application data storage area 20 by the installation program 40 is completed, the administrator sets the above-described association information 29, and the server 1 executes the association setting process S29 of storing the set association information 29 in the user data storage area. This enables completion of setting, for the accounts AC, of the access control information on access to the directories and databases in the data structure area. The above-described association information 29 is stored in, for example, the user data storage area 10.

In an example in FIG. 14, of the accounts AC, an account 1 that is a CEO is associated with the role X/role1 of the chief executive officer in the role table R_TABLE. An account 2 that is a staff member of the personnel department is associated with the role X/role 2 of an accounting and personnel staff member. An account 3 that is a staff member of the XX department is associated with the role X/role3 of a general staff member.

FIG. 15 is a flowchart of the user's access to the data in the application data storage area. The user accesses the server 1 through the browser in the user terminal 3 to access the application X in the storage area 2 (S30, S31). The user then inputs account information and authentication information such as a password through the user terminal 3. (S32) The application X authenticates the account (S33). After passing the authentication, the user transmits an access request for data in the application X in execution, through the user terminal 3 (S34). The application X accesses the application X data storage area 20 in the user data storage area 10 corresponding to the account, and identifies the role associated with the account based on the association information 29 on the association between the accounts AC and roles in the application data storage area 20. The application X then references the access control information table APLX_AATABLE to permit or reject the access request for the data based on the access authority set for the role associated with the account (S35). The role associated with the account is identified as above. If the access request is permitted, the user terminal 3 acquires the requested data (S36).

In the present embodiment, in the installation process in which the user makes the application available, the application data storage area 20 for the application is generated in the user data storage area 10 based on the application data storage area definition body file 50 for the application, and in the user data storage area 10, the role table (or role information) R_TABLE is further generated. The role table R_TABLE has a plurality of roles for which access control information AATABLE on access to the data structure area DATA_S in the application is set. Thus, a plurality of accounts AC sharing the user data storage area 10 can be associated with the plurality of roles in R_TABLE easily or using reduced man-hours. This enables a reduction in man-hours needed to set the access control information 29 for the newly installed application data storage area.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A method of utilizing an application data storage area in a user data storage area generated in storage of a user data storage area service server that includes the storage being accessible from a user terminal via a network, a memory and a processor, the method is executed by the processor, the method comprising:
    acquiring an application data storage area definition body file that includes:
        data structure information having a data structure of an application program,
        role data having a plurality of roles of the application program, and
        an access control information having access authority to the data structure for each of the plurality of roles,
    from an application storage area in the storage where the application program is stored, in response to a utilization request for the application program send from the user terminal;
    generating the application data storage area, in the user data storage area that is shared by a plurality of user accounts of a user;
    generating a data structure area, where data of the application program is stored, in the application data storage area, based on the data structure information;
    storing, in the user data storage area, a role table that include the plurality of roles of the application program, based onthe role data;
    storing, in the application data storage area, access control data that include the access authority for each of the plurality of roles in the role table on access to the data structure area, based on the access control information;
    storing, in the user data storage area, association data on association between the plurality of user accounts and the plurality of roles included in the role table, the association data being input from the user terminal; and
    allowing or rejecting, in response to an access request to the data structure area that is input from the user terminal, the access request, based on the association data and the access control data.

2. The application data storage area generation method according to claim 1, wherein the role information includes role information with application data storage area identification information in which the role data is associated with identification information of the application data storage area as attribute information.

3. The application data storage area generation method according to claim 1, further comprising:

setting, in the application storage area, access destination information for accessing the user data storage area, in response to the utilization request for the application.

4. The application data storage area generation method according to claim 1, further comprising:
performing authentication based on authentication information in the user data storage area, in response to the utilization request for the application,
wherein the generating the application data storage area is executed in response to the authentication.

5. An apparatus comprising:
a memory; and
a processor that executes a process including:
acquiring an application data storage area definition body file that includes:
data structure information having a data structure of an application program,
role data having a plurality of roles of the application program, and
an access control information having access authority to the data structure for each of the plurality of roles,
from an application storage area in the storage where the application program is stored, in response to a utilization request for the application program send from the user terminal;
generating the application data storage area, in the user data storage area that is shared by a plurality of user accounts of a user;
generating a data structure area, where data of the application program is stored, in the application data storage area, based on the data structure information;
storing, in the user data storage area, a role table that include the plurality of roles of the application program, based on the role data;
storing, in the application data storage area, access control data that include the access authority for each of the plurality of roles in the role table on access to the data structure area, based on the access control information;
storing, in the user data storage area, association data on association between the plurality of user accounts and the plurality of roles included in the role table, the association data being input from the user terminal; and
allowing or rejecting, in response to an access request to the data structure area that is input from the user terminal, the access request, based on the association data and the access control data.

6. A non-transitory computer storage medium that stores therein a computer readable program for causing a computer to execute an application data storage area generation process comprising:
acquiring an application data storage area definition body file that includes:
data structure information having a data structure of an application program,
role data having a plurality of roles of the application program, and
an access control information having access authority to the data structure for each of the plurality of roles,
from an application storage area in the storage where the application program is stored, in response to a utilization request for the application program send from the user terminal;
generating the application data storage area, in the user data storage area that is shared by a plurality of user accounts of a user;
generating a data structure area, where data of the application program is stored, in the application data storage area, based on the data structure information;
storing, in the user data storage area, a role table that include the plurality of roles of the application program, based on the role data;
storing, in the application data storage area, access control data that include the access authority for each of the plurality of roles in the role table on access to the data structure area, based on the access control information;
storing, in the user data storage area, association data on association between the plurality of user accounts and the plurality of roles included in the role table, the association data being input from the user terminal; and
allowing or rejecting, in response to an access request to the data structure area that is input from the user terminal, the access request, based on the association data and the access control data.

\* \* \* \* \*